United States Patent
Stoll et al.

(10) Patent No.: US 8,038,345 B2
(45) Date of Patent: Oct. 18, 2011

(54) SENSOR PLUG FOR COMBINED PRESSURE AND TEMPERATURE MEASUREMENT

(75) Inventors: Oliver Stoll, Reutlingen (DE); Christian Roesser, Grossbottwar (DE); Joerg Engelhardt, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 353 days.

(21) Appl. No.: 12/308,204

(22) PCT Filed: Aug. 20, 2007

(86) PCT No.: PCT/EP2007/058613
§ 371 (c)(1),
(2), (4) Date: Apr. 23, 2009

(87) PCT Pub. No.: WO2008/031691
PCT Pub. Date: Mar. 20, 2008

(65) Prior Publication Data
US 2010/0002745 A1 Jan. 7, 2010

(30) Foreign Application Priority Data
Sep. 15, 2006 (DE) .................. 10 2006 043 324

(51) Int. Cl.
*G01K 1/14* (2006.01)
*G01K 19/00* (2006.01)
*B23P 11/00* (2006.01)
(52) U.S. Cl. .................. 374/143; 374/E13.001
(58) Field of Classification Search .................. 374/143, 374/145, 150, 170, E13.001
See application file for complete search history.

(56) References Cited

U.S. PATENT DOCUMENTS

| 3,302,171 | A | * | 1/1967 | Sensing ........................ 374/143 |
| 4,062,231 | A | * | 12/1977 | Mercik et al. ............... 73/114.68 |
| 4,069,712 | A | * | 1/1978 | Armstrong et al. ........... 374/145 |
| 4,633,213 | A | * | 12/1986 | Venema ........................ 374/145 |
| 5,070,706 | A | * | 12/1991 | Waters et al. ................. 374/143 |
| 5,239,865 | A | * | 8/1993 | Salzer et al. .................. 374/143 |
| 5,379,637 | A | * | 1/1995 | Abowd et al. ................... 73/295 |
| 5,410,448 | A | * | 4/1995 | Barker et al. ................. 374/143 |
| 5,656,771 | A | * | 8/1997 | Beswick et al. ........... 73/114.68 |

(Continued)

FOREIGN PATENT DOCUMENTS
DE 197 45 244 4/1998
(Continued)

OTHER PUBLICATIONS

Robert Bosch GmbH: "Sensoren im Kraftfahrzeug" [Sensors in motor vehicles], 2001, p. 78, or in Stefan Butzmann (ed.), "Sensorik im Kraftfahrzeug" [Sensor technology in motor vehicles], expert Verlag, 2006, p. 77.

(Continued)

*Primary Examiner* — Yaritza Guadalupe
(74) *Attorney, Agent, or Firm* — Kenyon & Kenyon LLP

(57) ABSTRACT

A sensor plug for pressure and temperature measurement of a fluid medium includes a sensor body having a sensor body axis, as well as a pressure sensor disposed substantially concentrically on the sensor body axis. Also provided in the sensor body is a through orifice for connecting the pressure sensor to the fluid medium, and a temperature sensing element orifice having a temperature sensing element received therein. The temperature sensing element orifice has a temperature sensing element orifice axis that is inclined with respect to the sensor body axis in such a way that at its end pointing toward the fluid medium, it is inclined toward the sensor body axis.

12 Claims, 5 Drawing Sheets

U.S. PATENT DOCUMENTS

| | | | |
|---|---|---|---|
| 5,741,069 A * | 4/1998 | Egel | 374/146 |
| 7,010,967 B2 * | 3/2006 | Wakahara et al. | 73/114.68 |
| 2010/0265988 A1 * | 10/2010 | Newman et al. | 374/E13.001 |
| 2010/0284437 A1 * | 11/2010 | Stoll et al. | 374/143 |
| 2011/0088465 A1 * | 4/2011 | Niedzballa | 73/295 |

FOREIGN PATENT DOCUMENTS

| | | |
|---|---|---|
| DE | 101 09 095 | 8/2002 |
| DE | 101 57 068 | 9/2002 |
| DE | 10 2005 013 818 | 10/2005 |
| EP | 0 893 676 | 1/1999 |
| EP | 1 521 061 | 4/2005 |
| FR | 2 691 802 | 12/1993 |
| WO | WO 2007/078817 | 7/2007 |

OTHER PUBLICATIONS

Stefan Butzmann (ed.), "Sensorik im Kraftfahrzeug" [Sensor technology in motor vehicles], expert Verlag, 2006, pp. 73-81.

* cited by examiner

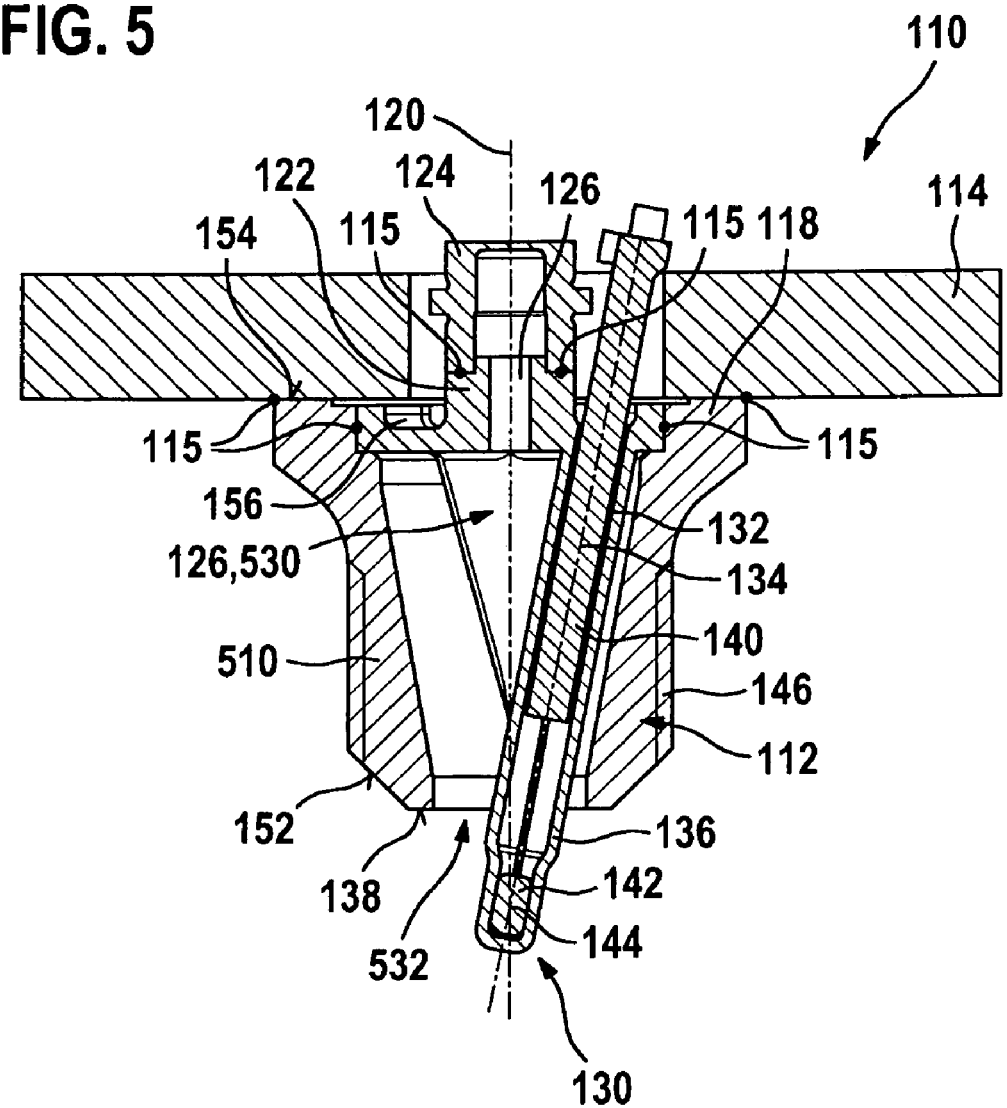

SENSOR PLUG FOR COMBINED PRESSURE AND TEMPERATURE MEASUREMENT

BACKGROUND OF THE INVENTION

1. Field of the Invention

The present invention relates to a sensor plug for pressure and temperature measurement, e.g., for fluid medium.

2. Description of Related Art

In various sectors of technology, different parameters of fluid media, i.e. of gases and/or liquids, must be measured simultaneously. In particular, a simultaneous measurement of pressure and temperature is necessary for many applications. Combined pressure and temperature measurement sensors, which are optimized for the relevant field of application, have been developed for this purpose.

Combined pressure and temperature sensors for climate control systems are an important application example in this context. In climate control systems, the heat of vaporization of a coolant is usually used to cool air (or another medium to be cooled). The coolant is then compressed again, and thereby liquefied, in a compressor. Upon compression, the coolant heats up. This absorbed heat is discharged back to the environment, usually at a gas cooler. The compression operation using the compressor must usually be controlled in such a way that the operating pressure does not exceed a predefined maximum pressure, and the operating temperature does not exceed a predefined maximum temperature. The pressure and temperature must be sensed for this purpose.

The use of two separate sensors for the sensing of pressure and temperature represents a considerable outlay, however, since at least two plugs and multiple cable bundles must be kept in stock. In addition, the use of multiple individual sensors creates multiple points at which the interfaces and connecting points of the individual components must be sealed with respect to one another. It is therefore desirable to obtain both the pressure signal and the temperature signal by way of a combined pressure and temperature sensor. Combined pressure and temperature sensors of this kind are known, for example, from European patent document EP 1 521 061, German patent document DE 101 09 095, and from German patent document DE 197 45 244 and European patent document EP 0 893 676.

For future climate control systems used in motor vehicles, it is to be expected that conventional R134a climate control systems will be replaced with $CO_2$ systems, since in accordance with EU legislation, the R134a coolant hitherto used in climate control systems will be entirely prohibited as of 2016. The operating pressures and temperature loads occurring with such $CO_2$ climate control systems are elevated as compared with conventional systems, creating entirely new demands in terms of pressure and temperature loads on components and sensors. For example, pressures of up to 140 bar and media temperatures of up to 180° C. occur during operation. Leakage requirements of less than 1 g per year are typically applied in terms of sealing of the systems.

With the approach to a combined pressure and temperature sensing element proposed in European patent document EP 0 893 676, a capacitor of variable capacitance is used, encompassing a flexible membrane for pressure measurement. A thermistor is placed onto the flexible membrane as a temperature sensing element. Comparatively complex seals for the membrane are used, using conventional O-rings that easily become embrittled when operated over longer periods (especially with the aforementioned higher temperature loads), so that pressure tightness is not guaranteed over the longer term.

A further disadvantage is the complex construction of the seals, which necessitates multiple working steps and thus greatly increases assembly time and assembly costs. A further disadvantage of the proposed approach is that the proposed measurement concept, in particular the temperature measurement concept, is comparatively inaccurate, since the pressure measurement membrane, with the thermistor on it, is located relatively far away from the measured medium.

With the approach according to German patent document DE 101 09 095, a front membrane sensor having an measurement finger placed on it, is used. This approach entails, however, the disadvantage that the sensor is very sensitive especially in the membrane region, so that it many cases a protective shield must be mounted in front. This approach is one used in motor racing applications, with a service life that is relatively short. A further disadvantage of the approach presented in German patent document DE 101 09 095 is that the accuracy of the pressure and/or temperature measurements using the proposed assemblage can vary greatly, under otherwise identical conditions, depending on the installation location of the combined sensor.

The installation problem just described is aggravated by the fact that in usual climate control systems such as those provided, for example, in a motor vehicle, the diameters of the coolant tubes are very small. These tube diameters are usually in the range of approx. 8 mm. Areas having a diminished flow velocity are thus created in the region of the sensor orifice, which must be larger than 8 mm (usually approx. 10 mm), since tubes having a greater diameter must be used in those regions. The measured medium cools more quickly in these areas, and the temperature deviates considerably from the actual media temperature. With an eccentric disposition of the temperature sensor, as proposed e.g. in German patent document DE 101 09 095, it can happen that the temperature sensing element, when threaded in, ends up in precisely these areas of temperature deviation. The accuracy of the temperature signal thus depends on the random position of the measurement finger after being threaded in. A central disposition of the temperature sensor is, however, difficult or impossible in many cases because of the central disposition (preferred for reasons of installation space) of the pressure sensor.

BRIEF SUMMARY OF THE INVENTION

The present invention therefore provides a sensor plug for pressure and temperature measurement of a fluid medium, in particular for use in the coolant circuit of a climate control system of a motor vehicle, which plug avoids the above-described disadvantages of the existing art and ensures good robustness simultaneously with good reproducibility of both the pressure signal and temperature signal. The sensor plug is usable in particular for service in $CO_2$ climate control systems.

One concept of the invention is to combine centrally disposed temperature measurement with conventional pressure sensor technology. The problem that, especially with small sensor plugs, the pressure sensor is usually disposed centeredly for design reasons, is solved by a special disposition of the various orifices that are required.

The proposed sensor plug therefore has a sensor body having a sensor body axis; the sensor body axis can be, for example, the axis of symmetry of the sensor body. This does not necessarily mean, however, that the sensor body must be configured entirely symmetrically. The sensor body further has a pressure sensor disposed substantially concentrically on the sensor body axis. This pressure sensor (and multiple pressure sensors can of course be also be provided) can be a membrane pressure sensor, for example a membrane pressure sensor such as the one described in Robert Bosch GmbH: "Sensoren im Kraftfahrzeug" [Sensors in motor vehicles], 2001, page 78, or in Stefan Butzmann (ed.), "Sensorik im Kraftfahrzeug" [Sensor technology in motor vehicles], expert Verlag, 2006, p. 77. Other types of pressure sensors, for example pressure sensors based on different measurement principles, are also usable.

The sensor plug according to the present invention further has a through orifice, disposed in the sensor body, that serves to connect the pressure sensor to the fluid medium. Also provided in the sensor body is a temperature sensing element orifice having a temperature sensing element received therein. In order to enable simultaneously a central (i.e. substantially concentric) disposition of the pressure sensor on the sensor body axis, but also central temperature measurement, the temperature sensing element orifice is equipped with a temperature sensing element orifice axis that is inclined with respect to the sensor body axis in such a way that at its end facing toward the fluid medium, it is inclined toward the sensor body axis. "Substantially" is to be understood in this context to mean that a slight deviation of the disposition of the pressure sensor from a concentric disposition can also be tolerated, although the deviation from concentric disposition is preferably equal to no more than 10% of the diameter of the pressure sensor.

The proposed disposition of the sensor plug with the inclined temperature sensing element orifice axis makes possible temperature measurement with increased accuracy, since centered temperature measurement (or temperature measurement in the vicinity of the center) is now possible despite the central disposition of the pressure sensor. It is thereby possible to implement simultaneously a physically small sensor plug that has a centered pressure sensor but nevertheless exhibits high accuracy in both pressure and temperature measurement.

In particular, the sensor plug can have a temperature sensor element, preferably an NTC resistor. The temperature sensing element orifice axis is preferably disposed so that it intersects the sensor body axis in the region of the temperature sensor element. For example, the temperature sensing element orifice (having corresponding orifice shoulders or the like) can be configured such that the temperature sensor element is correspondingly disposed and/or retained. A centered disposition of the temperature sensor element can thereby be guaranteed. The term "in the region" also encompasses certain tolerances, for example a deviation of the temperature sensor element from the intersection point between sensor body axis and temperature sensing element orifice axis of no more than 20% of the spatial extension of the temperature sensor element. Alternatively or additionally, the disposition selected can also be such that the intersection point between sensor body axis and temperature sensing element orifice axis is still located in the region of the spatial extension of the temperature sensor element.

The sensor plug can furthermore have a measurement finger protruding from the sensor body. In this case the temperature sensing element orifice is preferably embodied as a blind orifice and is disposed entirely or partly in the measurement finger. The temperature sensor element is then preferably received entirely or partly in the measurement finger.

For the above-described tube diameters in climate control systems, it has proven particularly successful if the temperature sensing element orifice axis and the sensor body axis enclose an angle in the range between 3° and 70°, preferably between 5° and 20°, and particularly preferably of approx. 13°. The usual sensor geometries can in this fashion be adapted particularly advantageously to existing systems; the angle actually used can be adapted, for example, to the sensor length, for example to a thread length.

In addition, the through orifice can also be configured in at least partly cylindrical fashion with a through orifice axis. This cylindrical configuration is particularly favorable in terms of production engineering. The through orifice axis is preferably likewise inclined with respect to the sensor body axis in such a way that the through orifice axis, at its end pointing toward the fluid medium, is inclined away from the sensor body axis. The through orifice axis can in this fashion, for example, "get around" the temperature sensing element orifice. For example, the through orifice axis and the temperature sensing element orifice axis can be configured in at least partly parallel fashion. In particular, the through orifice axis can be inclined, at its end pointing toward the fluid medium, away from the sensor body axis. Correspondingly, the through orifice axis and the sensor body axis can preferably enclose an angle in the same range as the angle range described above.

The sensor plug described above, in one of the embodiments presented, can be additionally improved by a variety of refinements that become particularly advantageously apparent in combination with the above-described inclinations of the orifice axes. For example, the sensor body can have an external thread for threading into a sensor plug orifice, as well as a conical seal disposed at its end pointing toward the fluid medium. In contrast to known assemblages, such as the assemblage known, for example, from Stefan Butzmann (ed.), "Sensorik im Kraftfahrzeug" [Sensor technology in motor vehicles], expert Verlag, 2006, pp. 73-81, this disposition of the sealing cone at the end of the sensor plug pointing toward the fluid medium has the advantage that the conical seal can be protected by the external thread from water splashes and from atmospheric moisture. Corrosion at the conical seal can thereby be greatly reduced or eliminated.

In addition, at least one discharge groove, preferably two discharge grooves, can be provided in the external thread, this/these groove(s) being configured to vent an overpressure when the external thread is threaded into the sensor plug orifice. This at least one discharge groove is easy to integrate in terms of design engineering, and greatly simplifies the threading-in operation.

A further concept, usable alternatively or additionally, consists in manufacturing the sensor plug entirely or partly using a powder-metallurgy process, preferably a metal injection molding (MIM) process. In particular, the sensor body can encompass an externally located threaded piece having an external thread, and an insert having the through orifice and the temperature sensing element orifice. At least the insert can be manufactured using the powder-metallurgy process.

Powder-metallurgy processes of this kind, in particular MIM processes, are known to one skilled in the art. In the MIM process, a suitable metal-powder mixture is mixed with various organic and/or inorganic materials in order to enable processing by way of an injection molding operation. For example, the mixture can encompass, in addition to the metal powder, one or more organic binder materials that ensure the necessary properties, for example thixotropy. After injection molding, which forms a so-called "green" compact, the binder material is then entirely or partly removed from the compact in a first temperature treatment step (which can also be entirely or partly replaced by chemical processes), and a so-called "brown" compact is thereby produced. The brown compact is then sintered in a further temperature treatment step; during sintering, the metal particles partly melt together with one another, and a solid (although usually porous) metal body is produced. Unlike with conventional, material-removing machining, an economical component can be created in this fashion. This economical component, in particular the insert, can then be combined with further components, for example the threaded piece, which has a more complex geometry that is difficult to manufacture using MIM technology. In this fashion, the advantages of conventional technologies can be combined with powder-metallurgy technologies.

Accordingly, a method for manufacturing a sensor plug of this kind is also proposed, in which method the insert is manufactured using the powder-metallurgy process, the threaded piece being manufactured not necessarily by powder metallurgy but also, for example, in conventional fashion (e.g. by removal of material). After manufacture of the insert and threaded piece, the insert is inserted into the threaded piece, and the insert and threaded piece are joined to one another in positively engaged and pressure-tight fashion. The use of laser welding methods has proven particularly successful. It is possible in this fashion to manufacture, economically, a sensor plug that is optimized for the use described, in particular in $CO_2$ climate control systems; that is physically small and easy to install; that can be produced even in large quantities; and that nevertheless exhibits, as compared with the existing art, high accuracy in measuring the temperature of the fluid medium.

BRIEF DESCRIPTION OF THE SEVERAL VIEWS OF THE DRAWING

FIG. 5 is a sectioned depiction of a second exemplifying embodiment of a sensor plug, having a sensor body constructed in two parts.

DETAILED DESCRIPTION OF THE INVENTION

Figure 1:
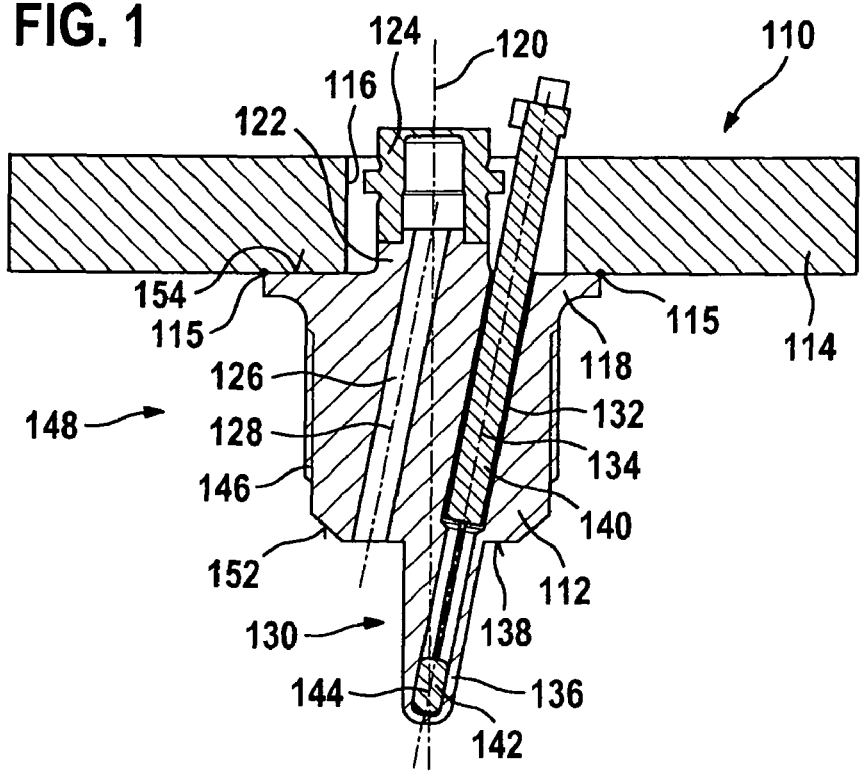
FIG. 1 is a cross-sectional drawing of a first exemplifying embodiment of a sensor plug.
Figure 2:
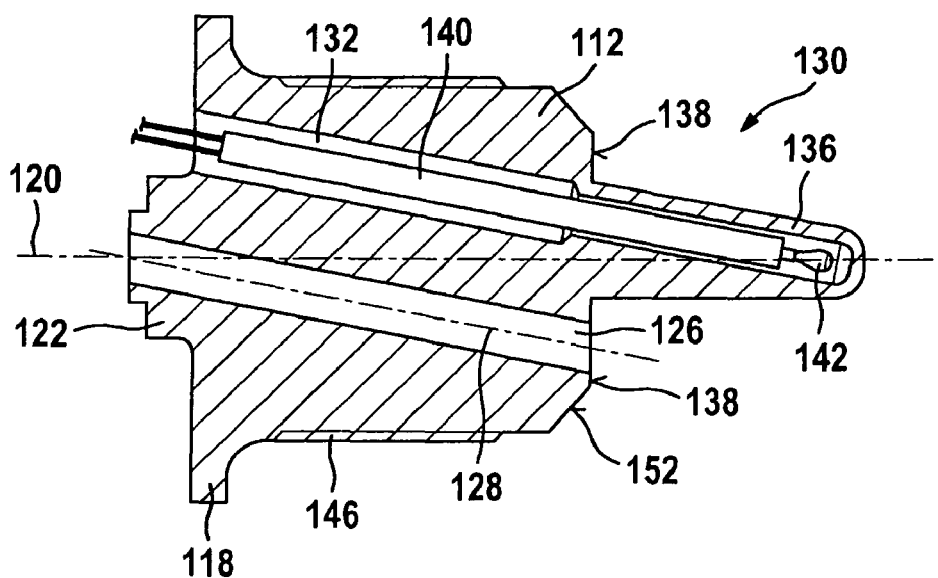
FIG. 2 is a cross-sectional drawing of a sensor body of the exemplifying embodiment according to FIG. 1.
Figure 3:
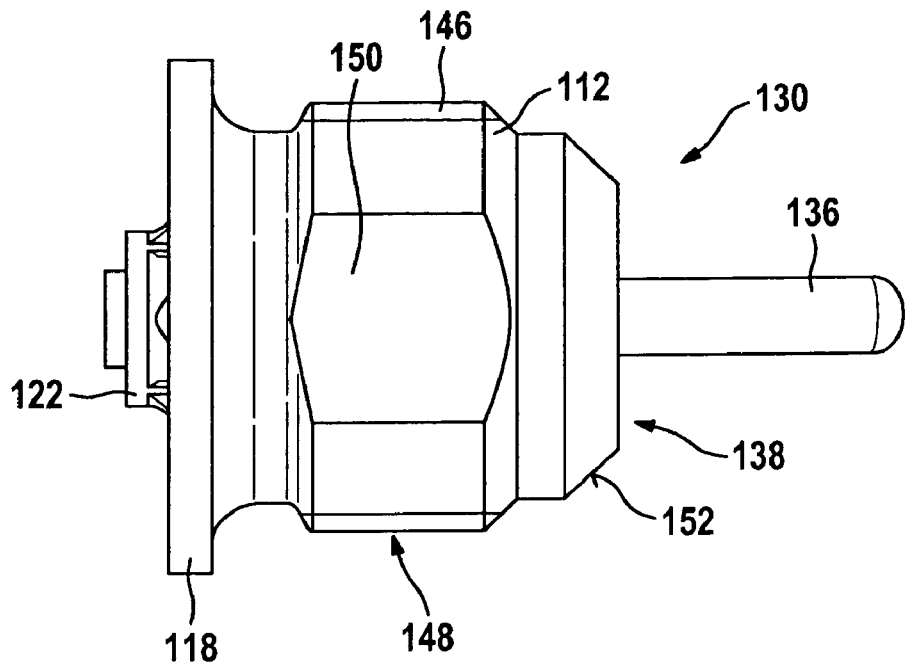
FIG. 3 is a side view of the sensor body according to FIG. 2.

FIGS. 1 through 4 depict a first exemplifying embodiment of a sensor plug 110 according to the present invention. FIG. 1 is a sectioned depiction of sensor plug 110, FIG. 2 a sectioned depiction of a sensor body 112 of sensor plug 110, FIG. 3 a side view of sensor body 112, and FIG. 4 a perspective depiction of sensor body 112. These Figures will be described below in combination.

Sensor plug 110 according to FIG. 1 has, in addition to sensor body 112, a hexagon 114 having a central orifice 116. Sensor body 112 is joined to hexagon 114 by an intermaterial connection 115 (e.g. welding) in such a way that sensor body 112 is disposed concentrically with central orifice 116, and the upper side of sensor body 112 is accessible through central orifice 116. The intermaterial connections of the individual components are labeled in general in the Figures with the reference character 115. For the purpose of this intermaterial connection 115, sensor body 112 has on its upper end, facing toward hexagon 114, an extension 118 having a supporting surface 154.

Sensor body 112 has a sensor body axis 120. Provided at the upper end of sensor body 112 is a sensor extension 122 which projects into central orifice 116 when sensor plug 110 is in the assembled state, and onto which, symmetrically with respect to sensor body axis 120, a pressure sensor 124 is placed and secured by intermaterial connection 115. This can be, as described above, a membrane pressure sensor 124, which is likewise preferably joined to sensor extension 122 by an intermaterial connection. Alternatively or additionally, positively engaged connections can also be used.

From extension 118, a through orifice 126 having a through orifice axis 128 extends as far as end 130, facing toward the fluid medium to be measured, of sensor plug 110. Through orifice axis 128 is inclined away from sensor body axis 120, and encloses therewith an angle of (in this exemplifying embodiment) approximately 10°. In addition, a temperature sensing element orifice 132 having a temperature sensing element orifice axis 134 is received in sensor body 112. At its end 130 facing toward the fluid medium, this temperature sensing element orifice 132 terminates, as a blind orifice, in a measurement finger 136 that projects, starting from a substantially circular end surface 138, into the fluid medium. Temperature sensing element orifice axis 134 is inclined toward sensor body axis 120 so that they likewise enclose an angle of approximately 10°. Received in temperature sensing orifice 132 is a temperature sensing element 140 that has at its lower end a temperature sensor element 142 in the form of an NTC resistor. Temperature sensor element 142 is encapsulated in temperature sensing element orifice 132 using a conductive adhesive, and is thereby simultaneously immobilized and thermally coupled to measurement finger 136. In order to reduce heat outflow through sensor body 112, the fill height of this thermally conductive adhesive is ideally selected so that only temperature sensor element 142 is surrounded by the conductive adhesive.

The oblique disposition of temperature sensing element orifice 132 relative to sensor body axis 120 guarantees that temperature sensor element 142 sits centrally in the flow of medium, regardless of the orientation at which sensor plug 110 is introduced into the medium. Correspondingly, temperature sensing element orifice 132 is selected, in this exemplifying embodiment, in such a way that the temperature sensor element ends up exactly centered over intersection point 144 between temperature sensing element orifice axis 134 and sensor body axis 120.

Sensor plug 110 is configured to be threaded into a sensor plug orifice (not depicted), for example a sensor plug orifice in a tubing system, described above, of a climate control system. Measurement finger 136 accordingly dips into the fluid medium to be measured. The length of sensor plug 110, i.e. the depth at which intersection point 144 is located within the fluid medium, is accordingly selected so that said intersection point 144 is preferably disposed centrally in the flow conduit of the fluid medium. In order to enable sensor plug 110 to be threaded into the sensor plug orifice, sensor body 112 is equipped with an external thread 146 that is evident in detail in the side view according to FIG. 3. This external thread 146 extends over only a part of the cylindrical-shell-shaped outer surface 148 of sensor body 112. To allow residual pressure in the system to dissipate as external thread 146 is threaded into the sensor plug orifice, two discharge grooves 150, through which the excess pressure is vented upon threading in, are located laterally on external thread 146. In this exemplifying embodiment, discharge grooves 150 are disposed diametrically opposite to one another. A different number of discharge grooves is also conceivable, as is a different embodiment and/or disposition of said discharge grooves 150.

A conical seal 152 in the form of a conical sealing surface is provided at the transition between cylindrical-shell-shaped outer surface 148 and end surface 138 of sensor body 112. In the present exemplifying embodiment, a cone angle of approx. 45° is used. An advantage of this disposition of conical seal 152 at end 130 of sensor plug facing toward the medium is, in particular, the fact that external thread 146 protects conical seal 152 from the penetration of water splashes.

Figure 4:
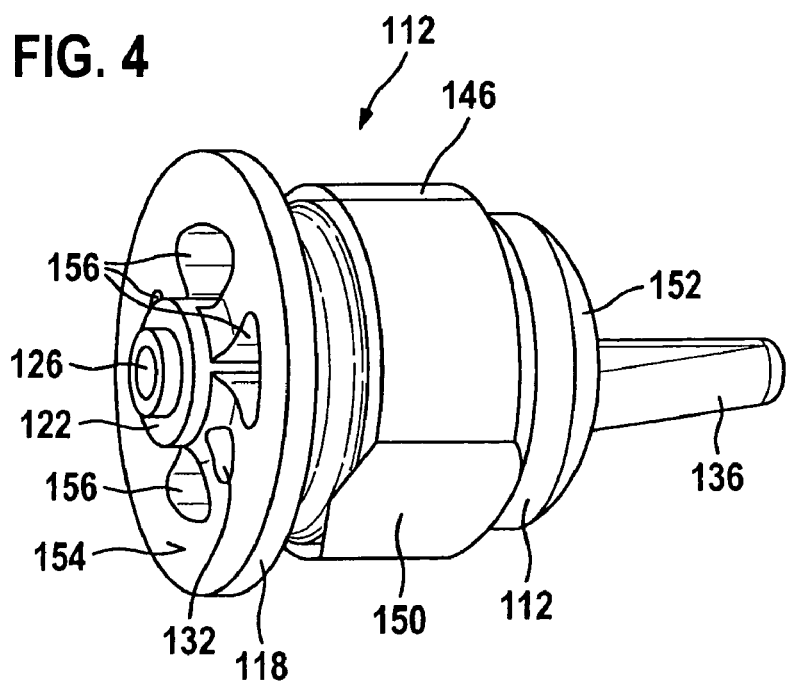
FIG. 4 is a perspective depiction of the sensor body according to FIG. 2, in an oblique view from above.

As is evident in particular from the perspective depiction of sensor body 112 in FIG. 4, sensor plug 110 is configured in a highly reduced-weight form in the present exemplifying embodiment. For this purpose, four cutouts 156 are provided on the substantially circular upper support surface 154 of sensor body 112, in the vicinity of sensor extension 122. These cutouts 156, which are disposed (see FIG. 1) as far as possible outside the region in which an intermaterial connection is made between sensor body 112 and hexagon 114, serve not only for weight reduction but also for uniform distribution of wall thicknesses, thus making possible better processing (for example in the context of an injection molding operation; see below). There is also a saving of material, which has a positive effect on manufacturing costs. Cutouts 156 have no function for the sensing of pressure and/or temperature. The strength of a weld seam between sensor body 112 and hexagon 114 is also not influenced by cutouts 156. Other configurations of cutouts 156, especially with regard to disposition, shape, and/or number, are also conceivable.

Sensor plug 110 is only shown incompletely in the depiction according to FIG. 1. In particular, further components of the sensor plug such as, for example, electrical connections to pressure sensor 124 and/or to temperature sensor element 142, are not depicted. It is accordingly usual to provided on hexagon 114, on the upper side (i.e. on the side located opposite end 130), a housing that contains, for example, a plug connector for contacting sensor plug 110 (supplying electrical energy and picking off signals), an electronics circuit board having a driving and evaluation circuit, and further components. The reader may be referred regarding this configuration, for example, to the citation described above (Stefan Butzmann).

Figure 6A:
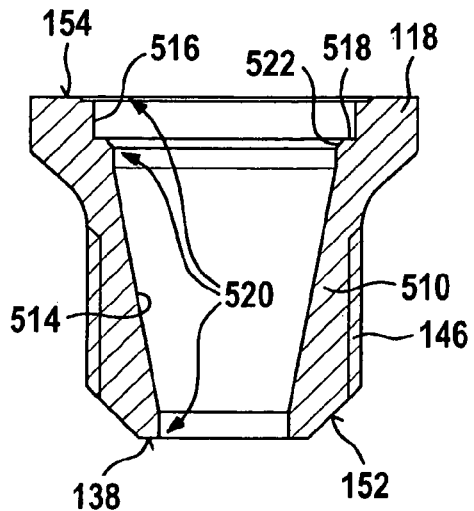
FIG. 6A is a sectioned depiction of a threaded piece of the sensor body in accordance with the exemplifying embodiment in FIG. 5.
Figure 6B:
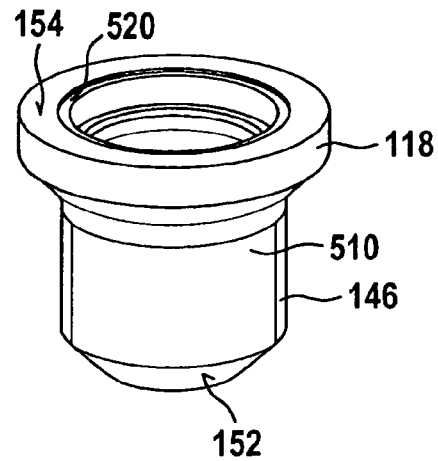
FIG. 6B shows the threaded piece according to FIG. 6A in a perspective depiction obliquely from above.
Figure 6C:
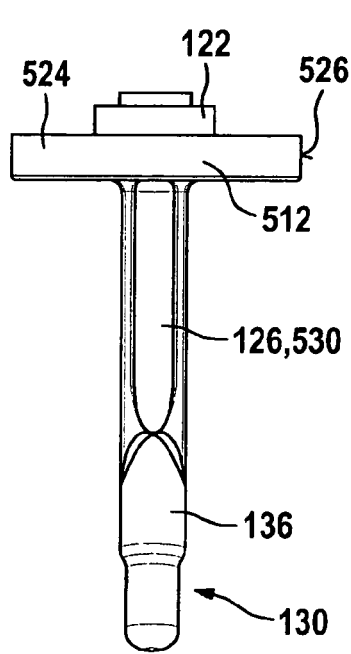
FIG. 6C is a side view of an insert of a sensor body in accordance with the exemplifying embodiment in FIG. 5.
Figure 6D:
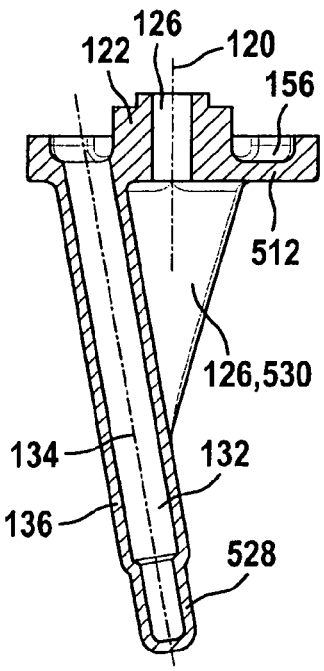
FIG. 6D is a sectioned depiction of the insert according to FIG. 6C.
Figure 6E:
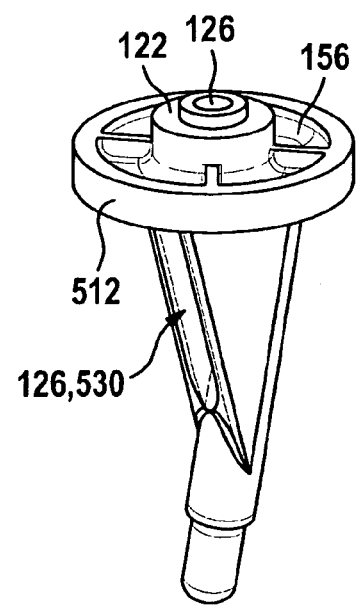
FIG. 6E shows the insert according to FIG. 6C in a perspective depiction obliquely from above.
Figure 7:
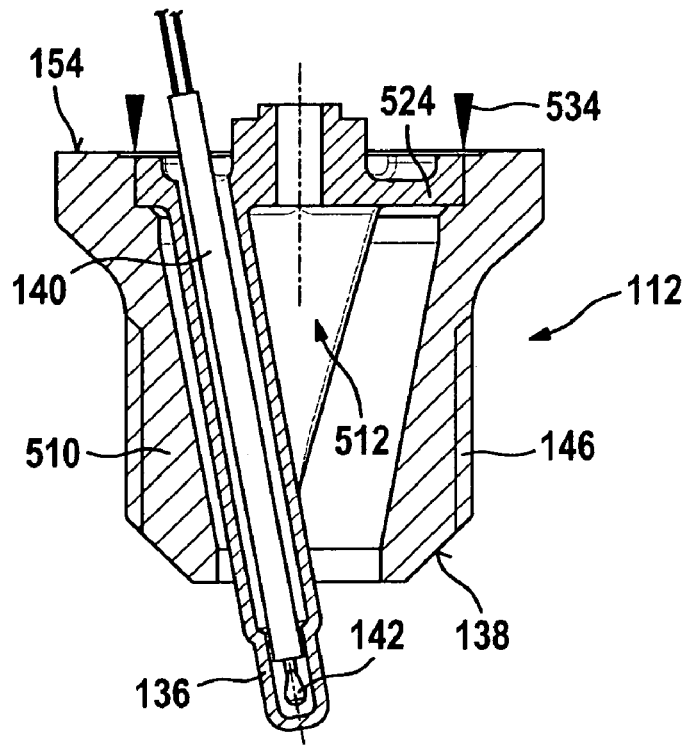
FIG. 7 shows a laser welding process for joining the insert to the threaded piece.
Figure 8:
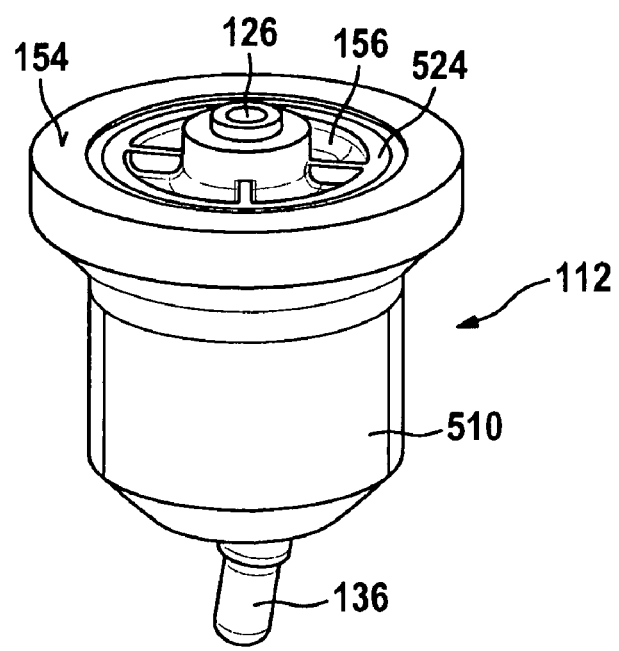
FIG. 8 shows the sensor body after laser welding.

FIGS. 5 through 8 depict a second exemplifying embodiment of a sensor plug 110 according to the present invention. In contrast to the exemplifying embodiment according to FIGS. 1 through 4, however, here sensor 112 is manufactured, as described above, using a powder-metallurgy injection molding process (MIM). The reasons for switching to the MIM process are the comparatively complex geometry and the oblique orifices, which can be implemented only with difficulty and at high cost by conventional, material-removing machining. FIG. 5 is a sectioned depiction of sensor plug 110 corresponding to the depiction in FIG. 1. Components of sensor plug 112 are shown in various depictions in FIGS. 6A through 6E. FIG. 7 shows a working step in which the components of sensor body 112 are joined to one another by intermaterial connection, and FIG. 8 is a perspective depiction of sensor body 112 obliquely from above.

As is evident from FIG. 5, the configuration according to the second exemplifying embodiment is largely similar to the configuration according to FIG. 1. A sensor body 112 is once again provided, joined by intermaterial connection to a support surface 154 having a hexagon 114. The intermaterial connections are once again labeled generally with the reference character 115. Similarly, a pressure sensor 124 is once again provided, placed onto a sensor extension 122 of sensor 112, as well as a temperature sensing element 140 having a temperature sensor element 142 that is introduced into a temperature sensing element orifice 132. A measurement finger 136 is also once again provided; the geometry, in particular the disposition of intersection point 144, corresponds to the geometry of the configuration in FIG. 1.

In contrast to the configuration according to FIG. 1, however, sensor body 112 according to the example in FIG. 5 is embodied substantially in two parts. Said body accordingly encompasses an externally located threaded piece 510 (see the depictions in FIGS. 6A and 6B) and an insert 512 (see the depictions in FIGS. 6C through 6E). Threaded piece 510, with its external thread 146, is fabricated in a conventional design as a lathe-turned part, and has on the outer side a conformation corresponding to sensor body 112 as depicted in FIGS. 1 through 4. An extension 118 is thus once again provided, as well as a support surface 154 on the side facing toward hexagon 114, for an intermaterial connection. A conical seal 152 is again provided at the transition to end surface 138. As a rule, only conical seal 152 usually serves for actual pressure sealing upon insertion of sensor body 112, whereas less stringent requirements in terms of sealing (ambient pressure only) usually need to be placed on extension 118 and on support surface 154 (or their intermaterial connections 115). Extension 118 and support surface 154 serve, as a rule, merely to transfer torques when sensor plug 110 is installed (e.g. threaded in).

In its interior, however, threaded piece 510 differs considerably from sensor plug 112 according to FIG. 1. For example, threaded piece 510 has internally a conical orifice 514 whose cone angle preferably corresponds substantially to the angle between temperature sensing element orifice axis 134 and sensor body axis 120, i.e. equals approximately 15°. At the end facing toward support surface 154, conical orifice 514 transitions into a cylindrical enlargement 516 having a support shoulder 518. Transition regions 520 in the form of further cylindrical orifices are additionally provided. A small insertion bevel 522 is provided at the transition between cylindrical enlargement 516 and conical orifice 514.

Insert 512 is depicted in detail in FIGS. 6C through 6E. In this exemplifying embodiment this insert is embodied, as described above, as a powder-metallurgy injection molded part and is accordingly optimized in its geometry in order to ensure, for example, unmolding once the injection molding operation is complete. For details of the MIM process, the reader may be referred to the description above. Insert 512 has at its upper end, below sensor extension 122, a head part 524 of substantially circular configuration. This head part 524 is equipped along its circumference with a welding surface 526 in the shape of a cylindrical surface.

Similarly to the configuration in FIG. 1, in insert 512 according to FIGS. 6C through 6E a temperature sensing element orifice 132 having a temperature sensing element orifice axis 134 is again provided. Measurement finger 136 is configured as a continuous blind sleeve that, starting from head part 524, extends downward to end 130 of the sensor plug facing toward the medium. Once again, as in the exemplifying embodiment according to FIG. 1, temperature sensing element orifice 132 has in the region of front end 130 a constriction 528 in which temperature sensor element 142 is received (see FIG. 5).

In contrast to the exemplifying embodiment according to FIG. 1, through orifice 126 is configured as a cylindrical orifice only in the region of head part 524. Through orifice 126 then transitions into a slot-shaped region 530, as is evident e.g. from the depictions of FIGS. 6C and 6D. When insert 512 is inserted into threaded piece 510, through orifice 126 is therefore delimited only partly by insert 512, and to a further partial extent by the inner wall of conical orifice 514. A pressure opening 532 between insert 512 and threaded piece 510 remains at end 130 of sensor plug 110 facing toward the medium, as shown in FIG. 5, so that fluid medium can travel through pressure opening 532 and slot-shaped region 530 to pressure sensor 124. Cutouts 156 are once again provided in the region of head part 524 of insert 512 for reasons of weight saving, material economy, and better material distribution (especially in the injection molding tool).

After threaded piece 510 and insert 512 are manufactured, the two parts must be joined to one another. This is shown schematically in FIG. 7 in a sectioned depiction. During this joining operation between threaded part 510 and insert 512, however, temperature sensing element 140 is usually not yet fitted into temperature sensing element orifice 132, as depicted in FIG. 7. As is evident from FIG. 7, for joining, firstly insert 512 is inserted into conical orifice 514 of threaded piece 510 so that head part 524 rests on support shoulder 518. The height of welding surface 526 of heat part 524 is dimensioned so that when insert 512 has been fitted in, the upper surface of head part 524 is located somewhat below support surface 154 of threaded piece 510, so that any weld seams that occur do not interfere with flush abutment against hexagon 114 (see FIG. 5).

After insertion, insert 512 is joined to threaded part 510 using an intermaterial connection process. A laser welding process, labeled in FIG. 7 with the reference number 534, is preferably used for this join, which must meet stringent requirements in terms of sealing and temperature resistance. After insert 512 and threaded part 510 are fitted together and after laser welding 534, further assembly of sensor plug 110 takes place by the fact that, for example, temperature sensing element 140 is inserted, pressure sensor 124 is put in place, and hexagon 114 and the further components of sensor plug 110 are installed.

FIG. 8 depicts sensor body 112 after laser welding, in the assembled state. It is clearly evident therefrom that head part 524 of insert 512 is recessed with respect to support surface 154.

What is claimed is:

1. A sensor plug for pressure and temperature measurements of a fluid medium, comprising:
    a sensor body having a sensor body axis, a through orifice and a temperature-sensing-element orifice disposed in the sensor body;
    a pressure sensor disposed substantially concentrically on the sensor body axis, wherein the through orifice disposed in the sensor body is configured to connect the pressure sensor to the fluid medium; and
    a temperature sensing element received within the temperature-sensing-element orifice;
    wherein the temperature-sensing-element orifice has a temperature-sensing-element-orifice axis inclined with respect to the sensor body axis in such a way that an end of the temperature-sensing-element-orifice axis pointing toward the fluid medium is inclined toward the sensor body axis.

2. The sensor plug as recited in claim 1, wherein the temperature sensing element has a temperature sensor device, and wherein the temperature-sensing-element-orifice axis is disposed to intersect the sensor body axis in a region of the temperature sensor device.

3. The sensor plug as recited in claim 2, wherein a measurement finger protruding from the sensor body is provided, and wherein the temperature-sensing-element orifice is configured as a blind orifice and disposed at least partly in the measurement finger, and wherein the temperature sensor device is disposed at least partly in the measurement finger.

4. The sensor plug as recited in claim 2, wherein the temperature-sensing-element-orifice axis and the sensor body axis enclose an angle in the range between 3° and 70°.

5. The sensor plug as recited in claim 2, wherein the through orifice is configured to be at least partly cylindrical, and wherein the through orifice has a through orifice axis.

6. The sensor plug as recited in claim 5, wherein the through orifice axis is inclined with respect to the sensor body axis in such a way that an end of the through orifice axis pointing toward the fluid medium is inclined away from the sensor body axis.

7. The sensor plug as recited in claim 6, wherein the through orifice axis and the sensor body axis enclose an angle in the range between 3° and 70°.

8. The sensor plug as recited in claim 2, wherein the sensor body has an external thread, and wherein a conical seal is provided at an end of the sensor body pointing toward the fluid medium.

9. The sensor plug as recited in claim 8, wherein at least one discharge groove is provided in the external thread, and wherein the at least one discharge groove is configured to vent an overpressure when the external thread is threaded into a sensor plug orifice.

10. The sensor plug as recited in claim 2, wherein the sensor plug is manufactured entirely using a powder-metallurgy process.

11. The sensor plug as recited in claim 10, wherein the sensor body includes: a) an externally located threaded piece having an external thread; and b) an insert having the through orifice and the temperature-sensing-element orifice, and wherein at least the insert is manufactured using a powder-metallurgy process.

12. A method for manufacturing a sensor plug for pressure and temperature measurements of a fluid medium, the sensor plug having: a sensor body having a sensor body axis, a through orifice and a temperature-sensing-element orifice disposed in the sensor body; a pressure sensor disposed substantially concentrically on the sensor body axis, wherein the through orifice disposed in the sensor body is configured to connect the pressure sensor to the fluid medium; and a temperature sensing element received within the temperature-sensing-element orifice; wherein the temperature-sensing-element orifice has a temperature-sensing-element-orifice axis inclined with respect to the sensor body axis in such a way that an end of the temperature-sensing-element-orifice axis pointing toward the fluid medium is inclined toward the sensor body axis, wherein the sensor body includes a) an externally located threaded piece having an external thread and b) an insert having the through orifice and the temperature-sensing-element orifice, the method comprising:
    manufacturing the insert of the sensor body using the powder-metallurgy process;
    manufacturing the externally located threaded piece of the sensor body;
    fitting the insert into the threaded piece; and
    joining the insert and threaded piece in a positively-engaged, pressure-tight connection using a laser welding process.

* * * * *